United States Patent
Okamoto et al.

[11] Patent Number: 6,164,082
[45] Date of Patent: Dec. 26, 2000

[54] AIR CONDITIONER WITH AIR CLEANER

[75] Inventors: Yoshikatsu Okamoto; Yoshiaki Ikuzawa, both of Osaka, Japan

[73] Assignee: Funai Electric Co., Ltd., Osaka, Japan

[21] Appl. No.: 09/270,660

[22] Filed: Mar. 16, 1999

[30] Foreign Application Priority Data

Mar. 17, 1998 [JP] Japan .................. P10-066312

[51] Int. Cl.⁷ .................. F25D 17/04; F25F 3/16
[52] U.S. Cl. .................. 62/317; 62/78; 96/15; 96/96
[58] Field of Search .................. 62/317, 78, 264; 96/15, 74, 96

[56] References Cited

U.S. PATENT DOCUMENTS

| | | | |
|---|---|---|---|
| 5,092,396 | 3/1992 | Murano et al. | 62/78 X |
| 5,290,343 | 3/1994 | Morita et al. | 96/96 X |
| 5,529,613 | 6/1996 | Yavnieli | 96/96 X |
| 5,716,586 | 2/1998 | Taniguchi | 422/173 X |

FOREIGN PATENT DOCUMENTS

| | | |
|---|---|---|
| 363127043 | 5/1988 | Japan . |
| 64-28427 | 1/1989 | Japan . |
| 401244222 | 9/1989 | Japan . |

*Primary Examiner*—William Doerrler
*Assistant Examiner*—Chen-Wen Jiang
*Attorney, Agent, or Firm*—Morgan, Lewis & Bockius LLP

[57] ABSTRACT

An air conditioner equipped with an air cleaner. In the air conditioner, a dust collector is arranged in an air path located behind a heat exchanger. A dust collecting electrode of the dust collector is combined with a heater for self-cleaning. An opening, which communicates the air path located behind the heat exchanger with the outside, is provided above the dust collector. An open-and-close valve, which is closed during the air conditioning operation and opened in the case where the air cleaning operation is carried out while the air conditioning operation is stopped, is provided at the opening. The dust collector does not interrupt the flow of air during the air conditioning operation and also in the case where the air cleaning operation is carried out while the air conditioning operation is stopped.

10 Claims, 7 Drawing Sheets

AIR CONDITIONER WITH AIR CLEANER

BACKGROUND OF THE INVENTION

1. Field of the Invention

This invention relates to an air conditioner equipped with an air cleaner.

2. Description of the Related Art

Recently, in order to improve the function of an air conditioner, intensive research has been conducted on an indoor unit which is equipped with an electronic dust collector. As is well known, the electronic dust collector is so designed that with high voltage applied between a discharge electrode and a dust collecting electrode, dust in the air is ionized by the discharge electrode, thus being adsorbed to the dust collecting electrode. With the dust collector equipped with the indoor unit of the air conditioner, the air conditioner has not only its original air conditioning function, but also an air cleaning function.

In the air conditioner, the position of installation of the dust collector is normally between the front grill and the heat exchanger which is provided behind it; that is, the front of the heat exchanger. In addition, Japanese Patent Unexamined Publication No. Sho. 64-28427 has disclosed the following air conditioner: In order to improve the dust collecting efficiency in the case where the dust collector is provided in front of the heat exchanger, dust collection is carried out in such a manner that, in front of the heat exchanger, the air is caused to flow upwardly in a zig-zag manner.

On the other hand, with respect to the cleaning of the dust collecting electrode which is a problem given to the dust collector, a maintenance-free type dust collector has been proposed in which a heater is mounted on the dust collecting electrode to burn and remove the dust stuck onto the dust collecting electrode.

By the way, the fundamental structure of the dust collector is the combination of a linear discharge electrode and a planar dust collecting electrode. A conventional air conditioner with an air cleaner in which the dust collector is installed in front of the heat exchanger of the air conditioner suffers from a problem that the suction of air is interrupted especially by the planar dust collecting electrode, so that its original air conditioning function is lowered.

That is, in the case where the dust collector is mounted in front of the heat exchanger of the air conditioner, normally the planar dust collecting electrode is provided above or below the linear discharge electrode, and the dust collecting electrode is provided along the surface of the heat exchanger. The reasons why the dust collecting electrode is provided along the surface of the heat exchanger are for instance as follows: The increase in depth of the air conditioner can be avoided. Also, in the case where an air cleaning operation is carried out with ion wind during the stop of the air conditioning operation, the flow of weak ion wind can be prevented from being interrupted by the dust collecting electrode. By the provision of the dust collecting electrode along the surface of the heat exchanger, the suction of air into the heat exchanger is interrupted; that is, the original air conditioning function is lowered.

This problem that the air conditioning function is lowered is significantly great especially when the maintenance-free type dust collector is used in which the dust collecting electrode is combined with the heater. That is, in the maintenance-free type dust collector, normally the heater is combined with a heat shielding plate or the like, and therefore, the ventilation resistance by the dust collector is further increased, and accordingly the suction of air into the heat exchanger is further interrupted. Hence, in the air conditioner with the air cleaner which employs the maintenance-free type dust collector in which the dust collecting electrode is combined with the heater, the decrease in the original air conditioning function is a great problem.

As is disclosed in Japanese Patent Unexamined Publication No. Sho. 64-28427, it goes without saying that also in the case where the dust collecting operation is carried out while the air is caused to flow in front of the heat exchanger upwardly in a zig-zag manner, a decrease in the air conditioning function is a problem.

SUMMARY OF THE INVENTION

In view of the foregoing, an object of the invention is to provide an air conditioner equipped with an air cleaner in which a decrease in the air conditioning function due to the provision of a dust collector is avoided, and even in the case where a maintenance-free type dust collector in which the dust collecting electrode is combined with a heater is employed, an increase in the ventilation resistance is effectively prevented; that is, the air conditioning function is maintained high.

In order to achieve the above object, the invention provides an air conditioner equipped with an air cleaner comprising: a casing which is opened as a suction inlet in a front surface thereof and has a discharge outlet below the suction inlet; a heat exchanger which is provided in the casing in such a manner that the heat exchanger is confronted with the suction inlet of the casing; a fan which is provided in a deep of the discharge outlet to cause air to flow from the suction inlet through the heat exchanger to the discharge outlet; and an electronic dust collector which is arranged in an air path located behind the heat exchanger to collect dust.

DETAILED DESCRIPTION OF THE PREFERRED EMBODIMENTS

Preferred embodiments of the invention will be described with reference to the accompanying drawings.

Figure 1:
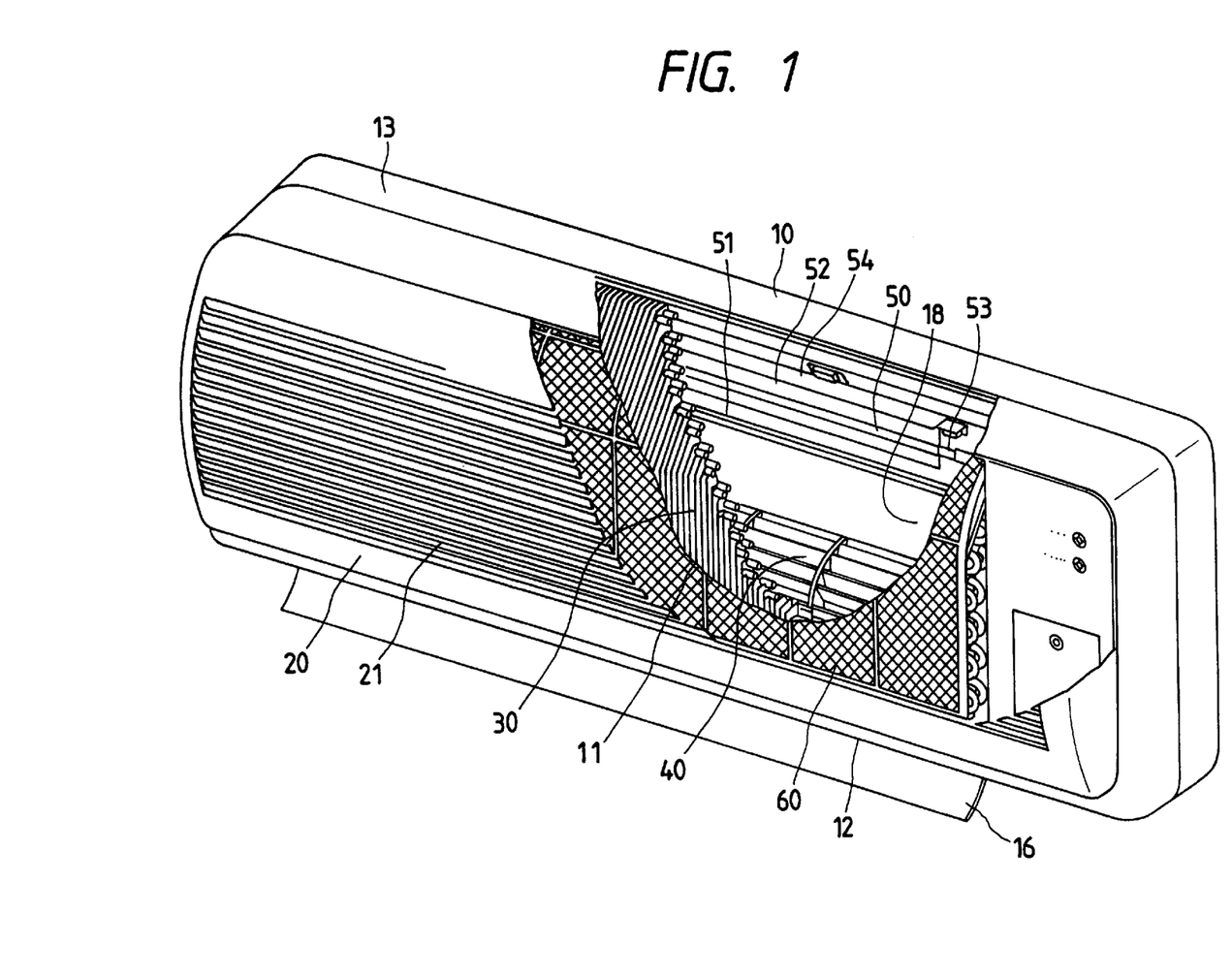
FIG. 1 is a perspective view, with parts cut away, showing an example of an air conditioner with an air cleaner, which constitutes a first embodiment of the invention.

As was described, an example of an air conditioner equipped with an air cleaner, which constitutes a first embodiment of the invention, is as shown in FIG. 1.

As shown in FIG. 1, the air conditioner, the first embodiment of the invention comprises: a casing 10 in which the front surface is open as a suction inlet 11, and which has a discharge outlet 12 below the suction inlet 11; an openand-close type front casing 20 which covers the suction inlet 11; a heat exchanger 30 which is provided in the casing 10 while confronting with the suction inlet 11; a cross-flow type fan 40 which is provided in the deep side of the discharge outlet 12 to cause the air to flow from the suction inlet 11 through the heat exchanger 30 to the discharge outlet 12; an electronic dust collector 50 which is arranged in an air path located behind the heat exchanger 30; an angle-adjustment type louver 16 which is swingably mounted on the discharge outlet 12; and a filter 60 which is provided between the front casing 20 and the heat exchanger 30.

Figure 4:
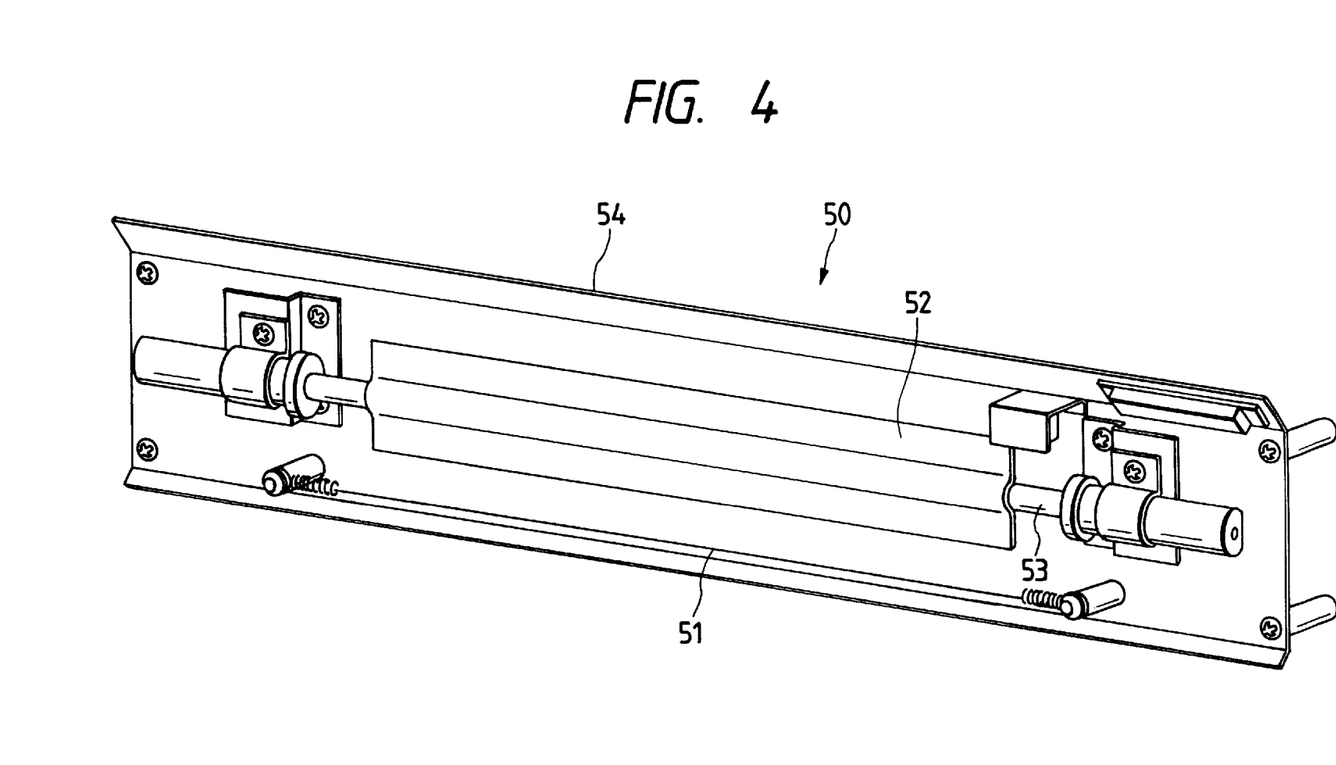
FIG. 4 is a perspective view of a dust collector employed in the air conditioner.
Figure 5:
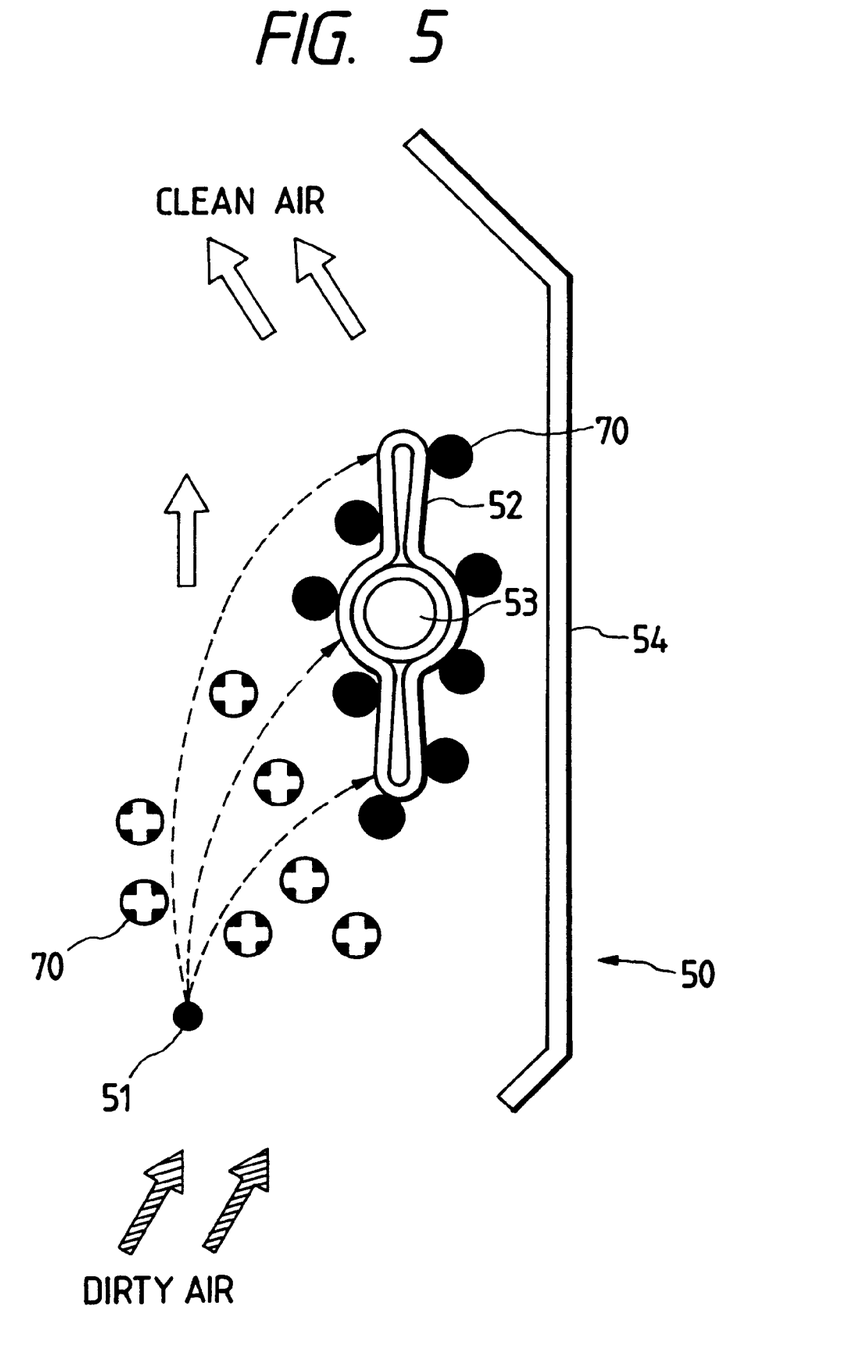
FIG. 5 is an explanatory side view for a description of the principle of collecting dust of the dust collector.

The electronic dust collector 50 arranged in the air path located behind the heat exchanger 30 is mounted on the surface of a vertical rear plate portion 18 of the casing 10. The dust collector 50, as shown in FIGS. 4 and 5, comprises: a linear discharge electrode 51 which is laid horizontally; a planar dust collecting electrode 52 provided above the linear discharge electrode 51; and a rod-shaped heater 53 which is to self-clean the dust collecting electrode 52. The dust collecting electrode 52 is of a dual (double) structure that the heater 53 is clamped from both sides. The dust collecting electrode 52 is held horizontally by the heater 53. The discharge electrode 51 and the heater 53 is mounted on the front of a heat shielding plate 54 which is directed forwardly, and the heat shielding plate 54 is mounted on the front surface of the vertical rear plate portion 18 of the casing 10. Accordingly, the planar discharge electrode 51 and the heat shielding plate 54 are laid along the stream of air which flows upwardly or downwardly in the air path located behind the heat exchanger 30.

Figure 2:
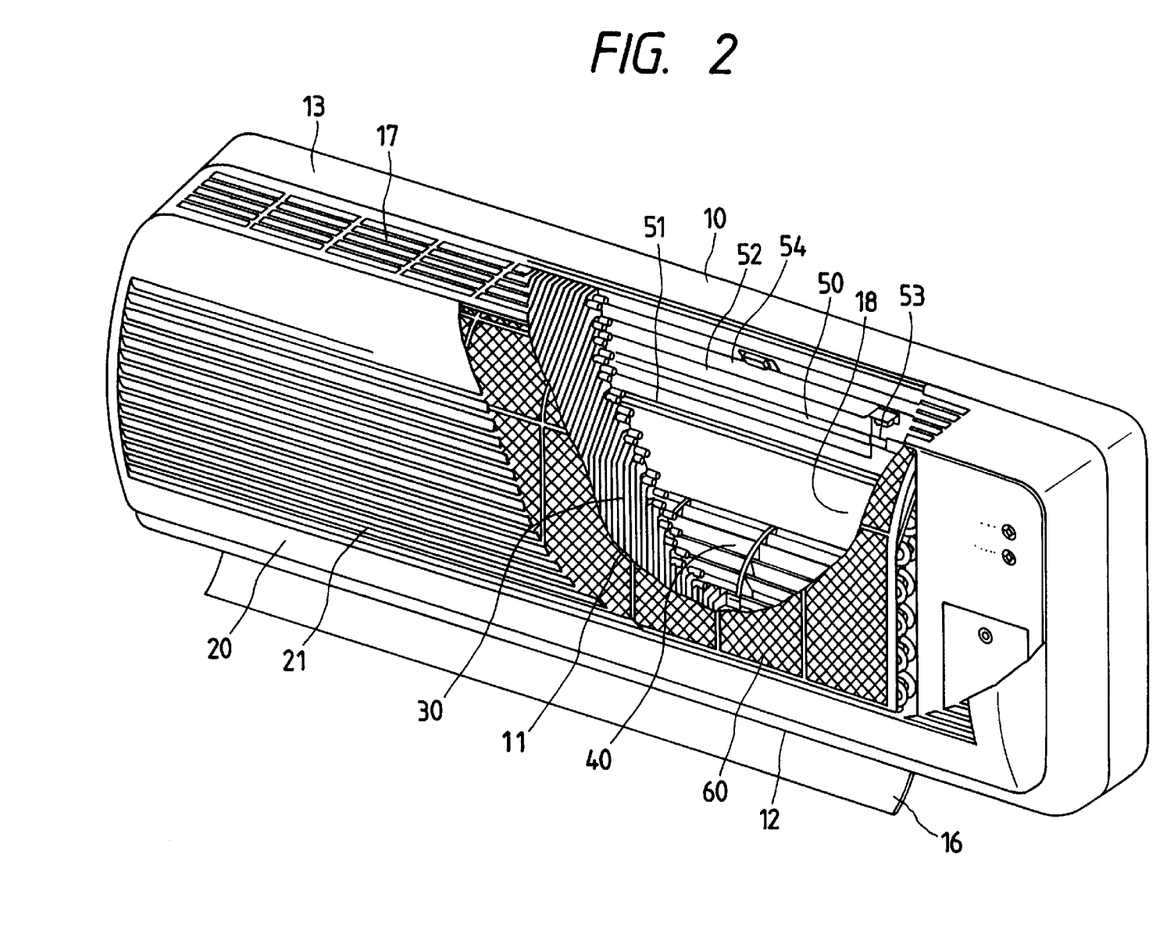
FIG. 2 is a perspective view, with parts cut away, showing another example of the air conditioner with the air cleaner, which constitutes a second embodiment of the invention.
Figure 3:
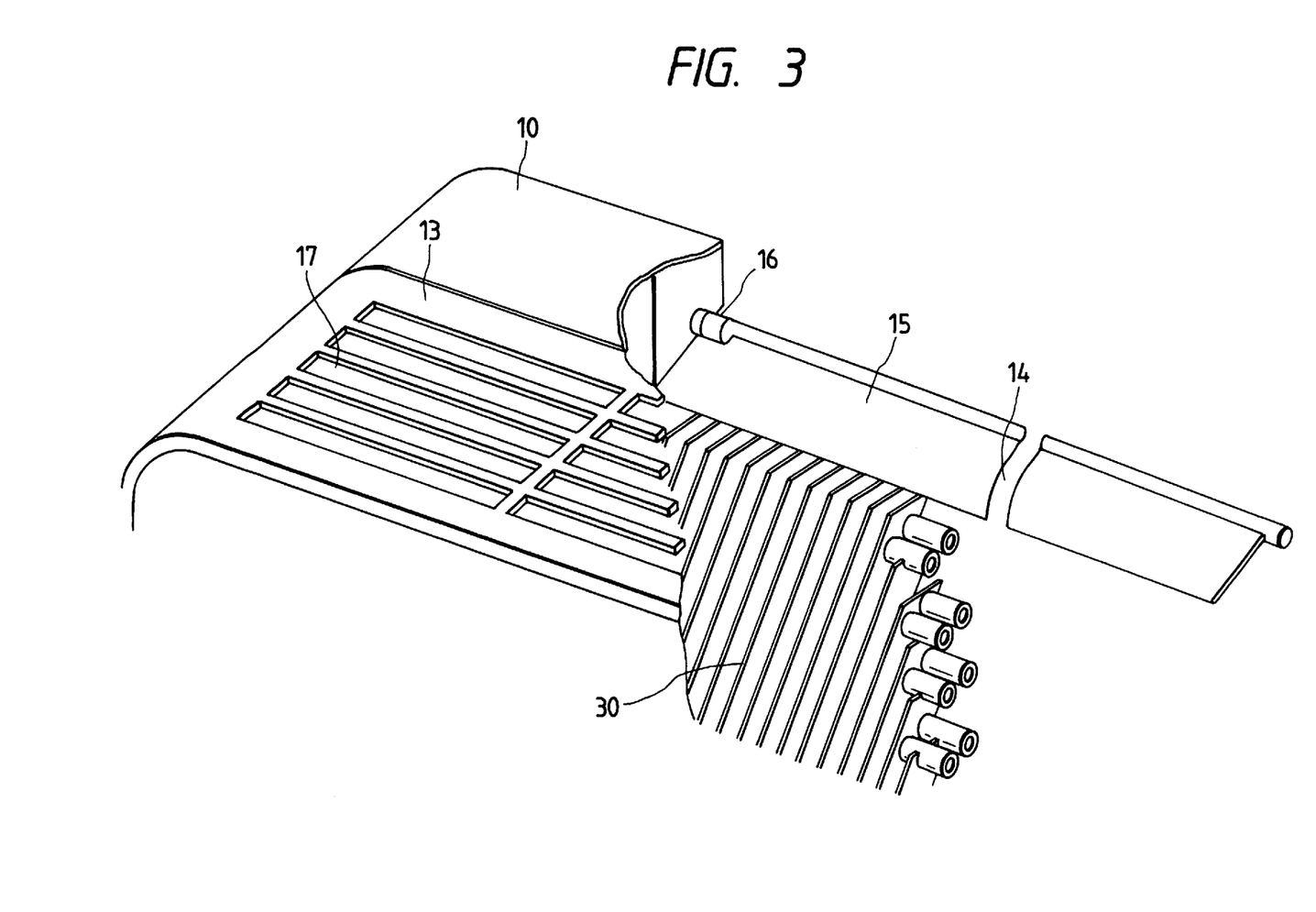
FIG. 3 is a perspective view, with parts cut away, showing the structure of components around the opening of the air conditioner.
Figure 6:
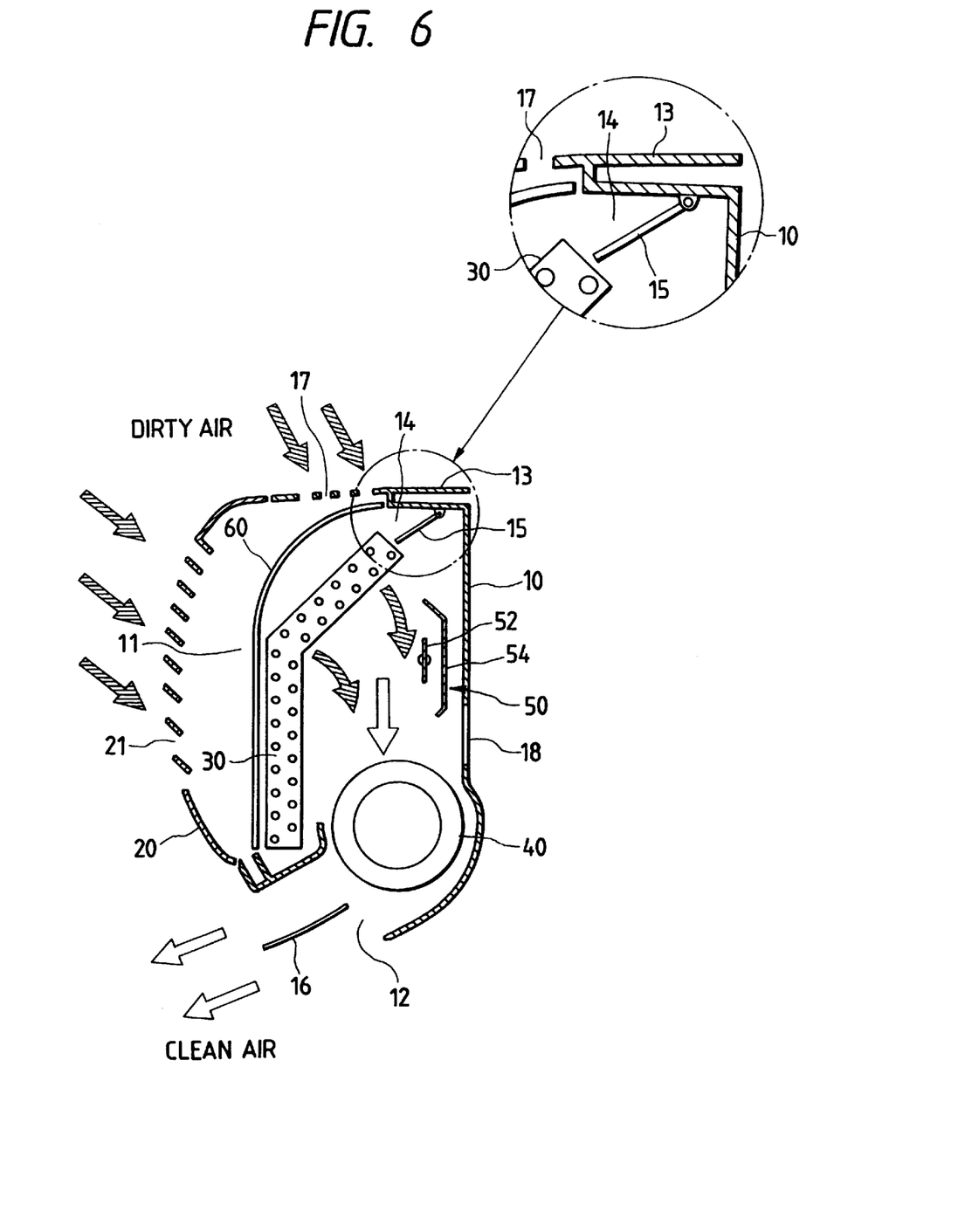
FIG. 6 is an explanatory side view of the air conditioner for a description of the flow of air and the operation of an open-and-close valve during an air conditioning operation.
Figure 7:
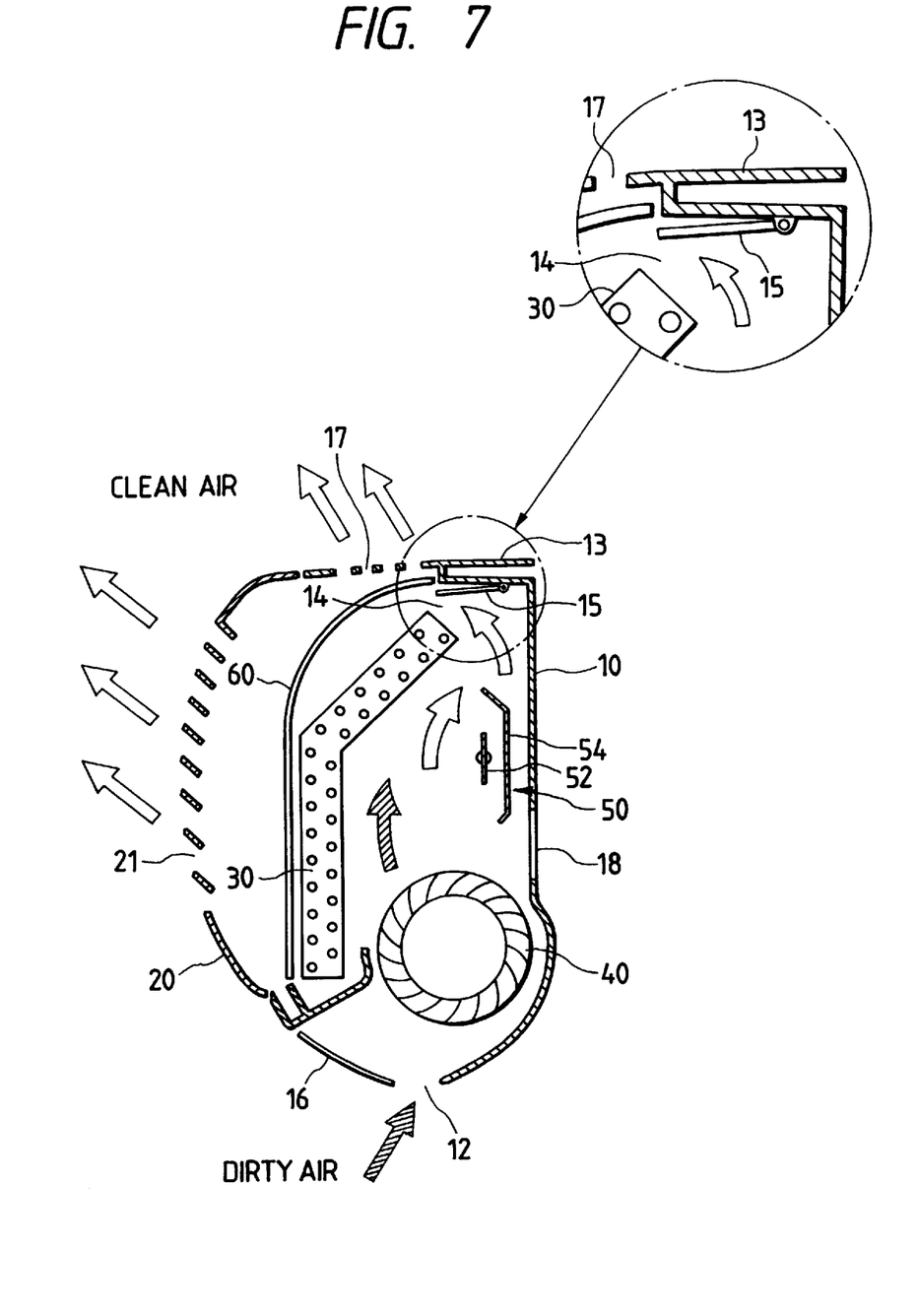
FIG. 7 is an explanatory side view of the air conditioner for a description of the flow of air and the operation of the open-and-close valve in the case where the air cleaning operation is carried out while the air conditioning operation is stopped.

FIG. 2 shows another example of the air conditioner, which constitutes a second embodiment of the invention. That is, as shown in FIG. 2, for the suction of air, a top plate portion 13 of a casing 10 has an upper grill 17, and a front casing 20 has a front grill 21 in its front portion. A heat exchanger 30 is so shaped that its upper portion is inclined backwardly as shown in FIGS. 6 and 7. A slit-shaped opening 14 is formed between the upper end of the heat exchanger 30 and the top plate portion 13 of the casing 10, in such a manner that the opening 14 is communicated with the upper grill 17 of the casing 10 over the substantially whole width of the heat exchanger 30. In the opening 14, a damper type open-and-close valve 15, which swings about its rear portion, is provided. The damper type open-andclose valve 15, as shown in FIG. 6, is urged by a spring (not shown) to open upwardly. Therefore, while a fan 40 is being stopped, the opening 14 is held open. On the other hand, when the fan 40 is driven so that the air path behind the heat exchanger 30 becomes negative in pressure, the valve 15 is swung downwardly against the urging force, so that the opening 14 is closed.

Now, the functions of the air conditioner with the air cleaner according to the first embodiment will be described.

During the air conditioning operation, the fan 40 is operated. Therefore, similarly as in the case of the conventional air conditioner, the air outside the room is caused to flow through the front grill 21 of the front panel 20 into the casing 10, so that the air passes through the heat exchanger 30, and moves downwardly in the air path, and then passes through the fan 40, thus being discharged into the room through the discharge outlet 12.

In the air path located behind the heat exchanger 30, the dust collector 50 is provided, and high voltage is applied between the discharge electrode 51 and the dust collecting electrode 52. Therefore, as indicated by the broken lines in FIG. 5, lines of electric force are formed between the discharge electrode 51 and the dust collecting electrode 52, and as a result, dust 70 in the air around the discharge electrode 51 is ionized, thus being attracted by the dust collecting electrode 52 and stuck onto the same. As a result, the air passed through the heat exchanger 30 is cleaned while passing through the air path located behind it, and finally discharged outside the room.

In the dust collector 50, the planar discharge electrode 51 and the heat shielding plate 54 are laid along the flow of air which runs downwardly in the air path located behind the heat exchanger 30, and they are mounted on the surface of the vertical rear plate portion 18 of the casing 10, thus being located at the outer edge of the flow of air. Therefore, they scarcely interrupt the flow of air which runs downwardly in the air path located behind the heat exchanger 30. Accordingly, although the air conditioner of the invention is of the maintenance-free type in which the dust collector 50 employs the heater 53 and the heat shielding plate 54, a decrease in the air conditioning function which is due to the provision of the dust collector 50 is prevented.

In the case where the air cleaning operation is carried out while the air conditioning operation is stopped, the fan 40 is stopped, and high voltage is applied between the discharge electrode 51 and the dust collecting electrode 52 of the dust collector 50. As the fan 40 is stopped, ion wind which runs upwardly is formed by the application of the high voltage between the discharge electrode 51 and the dust collecting electrode 52 of the dust collector 50. Owing to the ion wind thus formed, air is caused to flow from the discharge outlet 12 into the air path located behind the heat exchanger 30, and after being cleaned by the dust collector 50, flows out of the air conditioner through the front grill 17 of the casing 10. Accordingly, the air conditioner functions as an air cleaner.

In the dust collector 50, the planar discharge electrode 51 and the heat shielding plate 54 are provided along the flow of air which runs downwardly in the air path located behind the heat exchanger 30, and are mounted on the surface of the vertical rear plate portion 18 of the casing 10, thus being located at the outer edge of the flow of air. Hence, the stream of air which runs upwardly in the air path located behind the heat exchanger 30 is scarcely interrupted. Accordingly, a decrease in the air cleaning function which is due to the installation of the dust collector 50 is prevented.

As the dust collector 50 is continuously used, dust is collected on the surface of the dust collecting electrode 52. By suitably operating the heater 53, the dust is burnt and removed; that is, the surface of the dust collecting electrode 52 is maintained clean. Therefore, cleaning the dust collecting electrode 52 is unnecessary; that is, it is maintenancefree.

In the above-described embodiment, when the air cleaning operation is carried out while the air conditioning operation is stopped, the angle-adjustment type louver 16 is held closed; however, since the discharge outlet 12 of the casing 10 is not completely closed, an increase in the ventilation resistance by the louver 16 is small. In the case where the increase in the ventilation resistance by the louver is a problem, the problem can be solved by opening the louver 16 when the air cleaning operation is carried out.

On the other hand, during the air conditioning operation, in the air path located behind the heat exchanger 30, the direction of air moving in the air path is opposite to the direction of the ion wind formed by the dust collector 50. In the case where a decrease in the air cleaning function is a problem, the positions of the discharge electrode 51 and the dust collecting electrode 52 should be swapped. That is, in this case, the direction of the ion wind formed by the dust collector 50 is the same as the direction of the air moving in the air path located behind the heat exchanger 30.

Alternatively, the above-described problem can be solved as follows: The discharge electrode 51 and the dust collecting electrode 52 are set vertically and arranged in the direction of width of the casing 10, and the dust collecting electrode 52 is deformed into a fin-like one which is perpendicular to the vertical rear plate 17 of the casing 10.

In the embodiment, the heater 53 which self-cleans the dust collecting electrode 52 is provided in contact with the dust collecting electrode 52; however, it may be provided away from but near the dust collecting electrode 52.

Next, the functions of the air conditioner according to the second embodiment of the invention will be described. However, the description of the same functions as those of the above-described first embodiment will be omitted.

During the air conditioning operation, as shown in FIG. 6, the fan 40 is operated, so that the damper type open-and-close valve 15 is operated to close the opening 14. As a result, similarly as in the case of the conventional air conditioner, the air outside the room is caused to flow into the casing 10 through the front grill 21 of the front panel 20 and the upper grill 17, and after passing through the heat exchanger 30, is moved downwardly in the air path located behind the heat exchanger 30, and is then discharged into the inside of the room from the discharge outlet 12 through the fan 40.

In the case where the air cleaning operation is carried out while the air conditioning operation is stopped, as shown in FIG. 7, the fan 40 is stopped, and high voltage is applied between the discharge electrode 51 and the dust collecting electrode 52 of the dust collector 50. As the fan 40 is stopped as described above, the damper type open-and-close valve 15 is restored to open the opening 14. As the high voltage is applied between the discharge electrode 51 and the dust collecting electrode 52 as described above, ion wind is formed which flows upwardly. Owing to the ion wind thus formed, air is caused to flow through the discharge outlet 12 into the air path located behind the heat exchanger 30, and after being cleaned by the dust collector 50, flows out of the air conditioner through the opening 14. Accordingly, the air conditioner functions as an air cleaner.

The opening 14 is provided above the air path located behind the heat exchanger 30, and is provided at the position where the upper grill 17 of the casing 10 can be utilized. Therefore, in the case where the air cleaning operation is carried out while the air conditioning operation is stopped, the ventilation resistance is considerably low. That is, also in this regard, the second embodiment is high in the air cleaning function.

In the embodiment, the opening 14 is provided above the air path located behind the heat exchanger 30; however, the invention is not limited thereto or thereby. That is, if it is located above the dust collector 50, it may be provided, for instance, in the rear plate portion 18 of the casing 10.

Furthermore, in the embodiment, in order to simplify the structure, the open-and-close valve 15 for opening and closing the opening 14 is of the damper type in which a spring is employed; however, the invention is not limited thereto or thereby. For instance, it may be of the forcible open-and-close type in which it is opened and closed by an electric motor.

As was described above, in the case of the air conditioner equipped with the air cleaner according to the invention, the provision of the dust collector behind the heat exchanger makes it possible to prevent the increase in the ventilation resistance which is due to the provision of the dust collector during the air conditioning operation and also in the case where the air cleaning operation is carried out while the air conditioning operation is stopped. Hence, during the air conditioning operation, the air conditioning function is improved, and in the case where the air cleaning operation is carried out while the air conditioning operation is stopped, the decrease in the air cleaning function is prevented.

The provision of the opening above the dust collector further improves the air cleaning function when the air conditioning operation is stopped.

What is claimed is:

1. An air conditioner equipped with an air cleaner comprising:

a casing which is opened as a suction inlet in a front surface thereof and has a discharge outlet below said suction inlet;

a front casing which covers said suction inlet;

a heat exchanger which is provided in said casing in such a manner that said heat exchanger is confronted with said suction inlet of said casing;

a filter which is provided between said front casing and said heat exchanger;

a fan which is provided close to said discharge outlet to cause air to flow from said suction inlet through said heat exchanger to said discharge outlet; and an electronic dust collector which is arranged in an air path located behind said heat exchanger to collect dust, wherein atop plate portion of said casing has an upper grill.

2. The air conditioner as claimed in claim 1, wherein said dust collector is equipped with a heater for self-cleaning a dust cleaning electrode thereof.

3. The air conditioner as claimed in claim 1, wherein said dust collector is provided along a rear surface of said casing.

4. The air conditioner as claimed in claim 1, further comprising an angle-adjustment louver which is swingably mounted on said discharge outlet.

5. The air conditioner as claimed in claim 1, wherein said front casing has a front grill in its front portion.

6. An air conditioner equipped with an air cleaner comprising:

a casing which is opened as a suction inlet in a front surface thereof and has a discharge outlet below said suction inlet;

a heat exchanger which is provided in said casing in such a manner that said heat exchanger is confronted with said suction inlet of said casing;

a fan which is provided in a deep of said discharge outlet to cause air to flow from said suction inlet through said heat exchanger to said discharge outlet; and an electronic dust collector which is arranged in an air path located behind said heat exchanger to collect dust;

wherein an opening adapted to communicate said air path located behind said heat exchanger with the outside of said casing is provided above said dust collector, and said opening is equipped with an open-and-close valve which closes said opening during an air conditioning operation and opens said opening when the air conditioning operation is stopped.

7. The air conditioner as claimed in claim 6, wherein said opening is provided above said air path located behind said heat exchanger.

8. The air conditioner as claimed in claim 6, further comprising an angle-adjustment louver which is swingably mounted on said discharge outlet.

9. The air conditioner as claimed in claim 6, wherein a top plate portion of said casing has an upper grill.

10. The air conditioner as claimed in claim 6, wherein said front casing has a front grill in its front portion.

* * * * *